United States Patent [19]
Boyer et al.

[11] 3,871,936
[45] Mar. 18, 1975

[54] LOADING OF COMPLIANT TAPE

[75] Inventors: John A. Boyer, Allentown; David P. Ludwig; Friedrich Zwickel, both of Whitehall, all of Pa.

[73] Assignee: Western Electric Company, Incorporated, New York, N.Y.

[22] Filed: Aug. 24, 1973

[21] Appl. No.: 391,435

Related U.S. Application Data

[62] Division of Ser. No. 185,648, Oct. 1, 1971.

[52] U.S. Cl. .............. 156/238, 29/203 B, 29/471.1, 29/626, 156/241, 156/298, 156/302, 156/356, 206/330, 206/331

[51] Int. Cl. .............................................. B65d 85/00

[58] Field of Search ........... 156/238, 356, 297, 298, 156/288, 241, 302, 547, 552, 578; 29/626, 303 B, 471.1; 260/328, 330, 331

[56] References Cited

UNITED STATES PATENTS

| | | | |
|---|---|---|---|
| 2,946,370 | 7/1960 | Muttera, Jr. | 156/302 |
| 3,465,874 | 9/1969 | Hugle et al. | 206/330 |
| 3,517,438 | 6/1970 | Johnson et al. | 29/626 |
| 3,533,155 | 10/1970 | Coucoulas | 29/471.1 |
| 3,608,711 | 9/1971 | Wiesler et al. | 206/330 |

*Primary Examiner*—Charles E. Van Horn
*Assistant Examiner*—Michael W. Ball
*Attorney, Agent, or Firm*—W. O. Schellin; P. J. Tribulski, Jr.

[57] ABSTRACT

Beam lead semiconductor devices are loaded onto an apertured compliant-bonding tape and held thereto with a releasable adhesive. The apertured tape is successively indexed through a loading machine. At one station, small accurately located dots of adhesive are applied to the tape. At a transfer station, integrated-circuit chips are pressed against the tape so that beam leads are secured to the dots of adhesive. Integrated-circuit chips are brought to the transfer station in spring-biased holding nests mounted on an indexable turret.

The compliant tape is embossed to form protective pockets therein so that when integrated-circuit chips are loaded onto the tape, subsequent winding of the tape onto a reel will not damage the chips.

3 Claims, 12 Drawing Figures

LOADING OF COMPLIANT TAPE

This is a division, of application Ser. No. 185,648 filed Oct. 1, 1971.

BACKGROUND OF THE INVENTION

1. Field of the Invention

This invention relates to methods for loading beam-lead semiconductor devices onto continuous compliant-bonding tapes.

2. Description of the Prior Art

When bonding beam-lead semiconductor devices, such as integrated-circuit chips described in U.S. Pat. No. 3,426,252 issued to M. P. Lepselter on Feb. 4, 1969 to substrates, it is highly advantageous to employ a technique known as compliant bonding. Compliant bonding is described in U.S. Pat. No. 3,533,155 issued to A Coucoulas on Oct. 13, 1970. A particularly effective technique for adapting compliant bonding to high-speed production is described in patent applications, Ser. No. 863,259 filed on Oct. 2, 1969, now U.S. Pat. No. 3,640,444, issued on Feb. 8, 1972; in the name of D. P. Ludwig, and Ser. No. 173,447 filed on Aug. 20, 1971 in the names of J. N. Lesyk, D. P. Ludwig and J. J. Monahan, now U.S. Pat. No. 3,771,711 and assigned to the assignee of record of this application.

In using the above-described systems for compliant bonding, there has been a long-standing desire to provide a continuous compliant-bonding tape to a bonding operation in which the integrated-circuit chips are already loaded. Thus, a reel of loaded tape could be placed on a bonding machine and the tape could be indexed across the bonding head, with an integrated-circuit chip arriving at the bonding tip with each successive index of the tape. The small size and delicate nature of beam-lead, integrated-circuit chips has, heretofore, frustrated attempts to achieve a practical operation in which such pre-loaded tapes are used for bonding. The only known technique for loading the very delicate chips onto a tape are manual ones and these are very cumbersome and time consuming. As a result of this lack of a practical technique, compliant bonding has continued to be an operation in which chips are engaged with the tape during the bonding operation rather than prior to the operation.

Another problem that has prevented a practical pre-loading of chips onto a tape, is that damage occurs when chips are loaded on the tape and the tape is reeled onto itself in a winding operation. The various compressed convolutions of the tape cause bending and destruction of the very delicate gold leads of the chips, which leads are usually only 0.004 inch wide and 0.0005 inch thick.

SUMMARY OF THE INVENTION

It is therefore an object of the invention to provide a new and practical system for loading beam-lead semiconductor devices onto a compliant tape.

Another object of the invention is to accomplish such loading in an efficient manner consistent with sound and economical production practices.

Still another object of the invention is to accomplish a pre-loading of beam-lead semiconductor devices into a compliant tape, wherein the tape can be wound onto a reel without damage to the loaded devices.

These objectives are achieved by placing a device into a receiving unit; applying adhesive resin to successive desired portions of a continuous compliant-bonding tape; translating a portion of the tape with adhesive thereon to a transfer position and also translating the device-receiving unit to the transfer position. The translated device and the translated portion of the tape with adhesive thereon, are displaced relative to each other so that the device is contacted to the tape. Thus, the device is secured to the adhesive. Repetitive operation of the system results in a loading of an entire continuous tape.

BRIEF DESCRIPTION OF THE DRAWINGS

Other objects and features of the present invention will be more readily understood from the following detailed description of specific embodiments thereof, when read in conjunction with the appended drawings in which.

DETAILED DESCRIPTION

Figure 1:
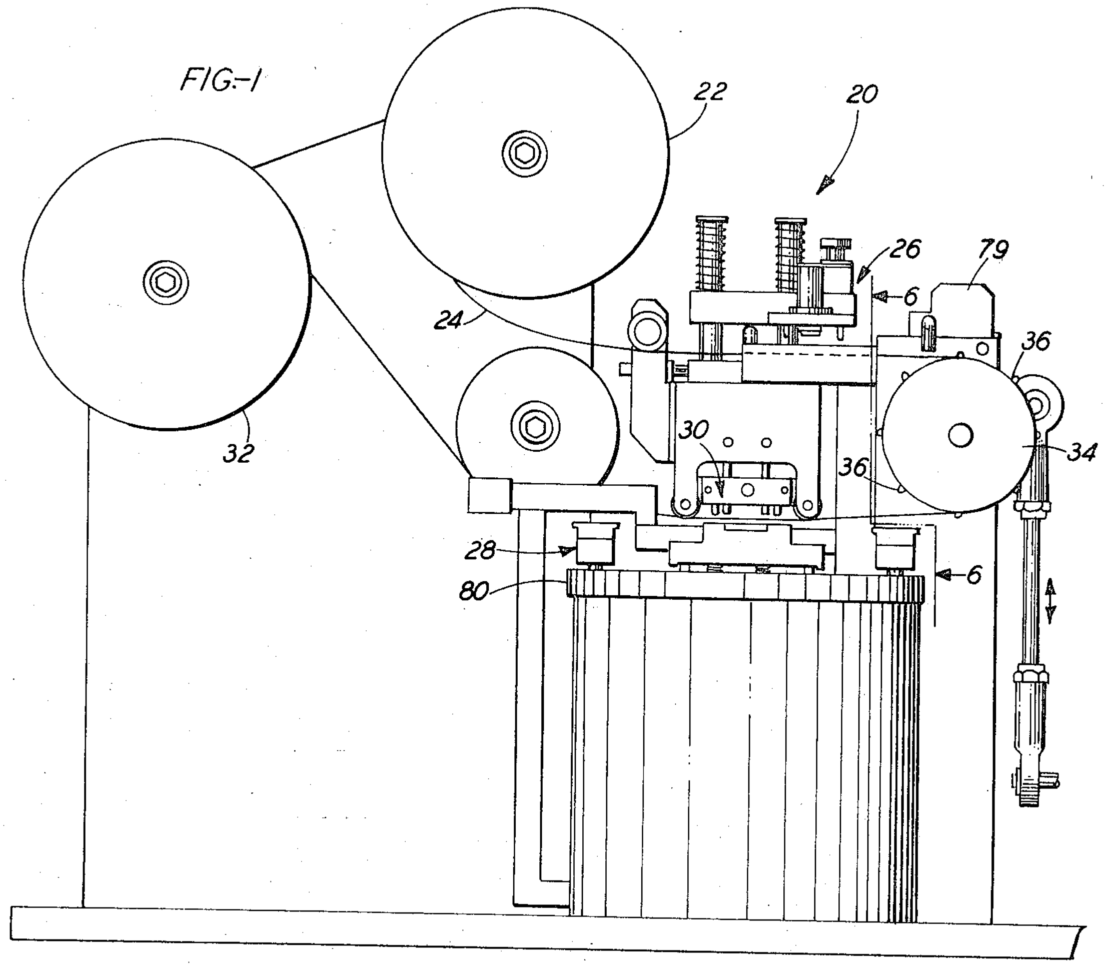
FIG. 1 is an overall elevational view of a loading machine useful for loading beam-lead semiconductor articles onto a continuous complaint-bonding tape.

A tape-loading machine, designated generally by the numeral 20, is illustrated in FIG. 1. The machine 20 includes a supply reel 22 for a compliant-bonding member or tape 24; an adhesive-application station, designated generally by the numeral 26; a plurality of device-receiving members or loading nests, designated generally by the numeral 28; a tape loading or transfer station, designated generally by the numeral 30 and a takeup reel 32. The compliant-bonding tape 24 is progressively indexed through the machine 20 with a drive sprocket 34.

The drive sprocket 34 has projections 36 thereon which engage with sprocket apertures 38 formed in the tape 24. The sprocket apertures 38 are alternately arranged with chip cavities or chip apertures 40.

Figure 3:
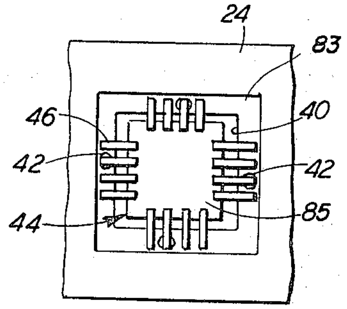
FIG. 3 is an enlarged view of the compliant tape of FIG. 2 showning a beam-lead semiconductor device loaded onto the tape.
Figure 2:
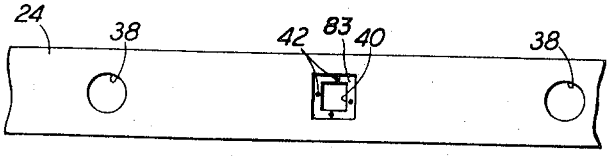
FIG. 2 is an enlarged view of a portion of a compliant-bonding tape with adhesive deposited thereon.

With each successive index of the sprocket 34, one of the chip apertures 40 is positioned into both the adhesive-application station 26 and the transfer station 30. Within the adhesive-application station 26 four small dots 42 of adhesive resin are placed on the tape 24 as shown in FIG. 2. The dots 42 are very accurately located with respect to the sprocket apertures 38 so that when each of the chip apertures 40 are eventually indexed around to the transfer station 30, a beam-lead integrated-circuit device or chip 44 can be transferred to the tape 24 and four beam-leads 46 of the chip will contact the four dots 42 of adhesive as shown in FIG. 3.

After the chips 44 are adhesively secured to the tape 24, the tape is wound onto the takeup reel 32. A full package of the loaded tape 24 can be removed from the reel 32 and taken to a bonding machine such as one of those described in patent applications, Ser. No. 863,259 filed on Oct. 2, 1969 now U.S. Pat. No. 3,640,444, issued Feb. 8, 1972 in the name of D. P. Ludwig, and Ser. No. 173,447 filed on Aug. 20, 1971 in the names of J. N. Lesyk, D. P. Ludwig and J. J. Monahan, now U.S. Pat. No. 3,771,711 and assigned to the assignee of record of this application.

A detailed understanding of the operation of the adhesive-application station 26 and the transfer station 30 can be had by referring to FIGS. 4 through 10.

Figure 4:
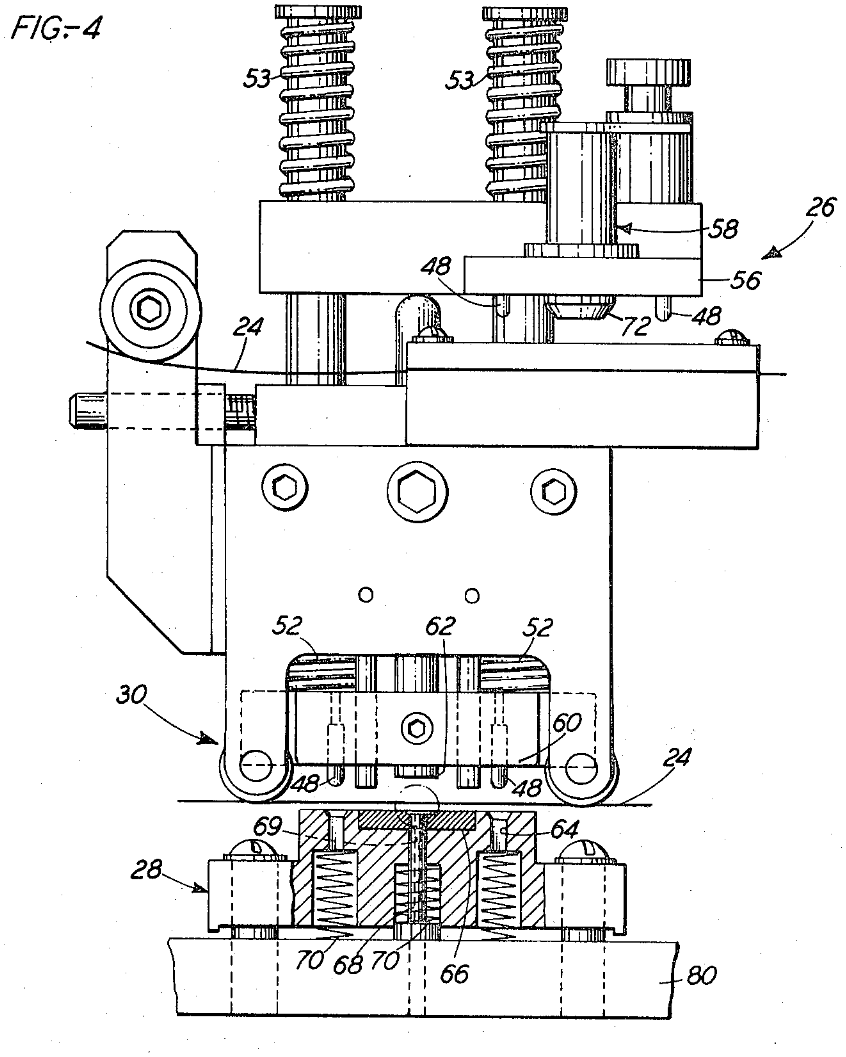
FIG. 4 is an enlarged view of a portion of the machine of FIG. 1 with portions thereof removed for purposes of clarity.
Figure 5:
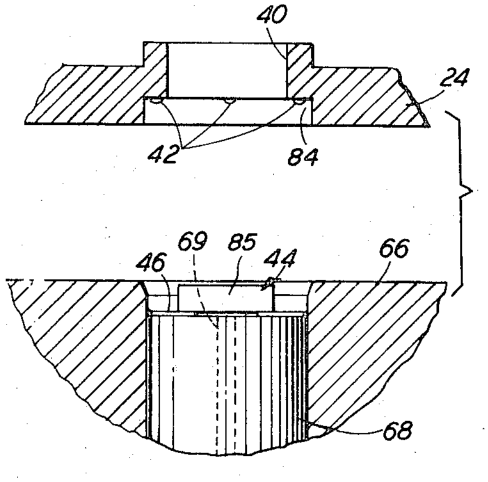
FIG. 5 is an enlarged view of the encircled portion of the machine shown in FIG. 4.

In FIG. 4 the stations 26 and 30 are shown in their opened or disengaged position. In this position, the tape 24 can be freely moved through the stations as is necessary during indexing. After an indexing step is completed, the sprocket apertures 38 are roughly or generally aligned with alignment pins 48 on both of the stations 26 and 30. When such general alignment is achieved, a cam roller arm 50 (see FIG. 6) is pivoted downwardly.

Downward pivoting of the arm 50 permits compression springs 52 and 53 to force a cam block 54 downwardly. The cam block 54 is rigidly connected to a support member 56 which holds two of the alignment pins 48 and an adhesive applicator 58. Also connected to the cam block 54 is a support member 60 in which there are mounted two of the alignment pins 48 and a transfer ram 62. It can be seen that the downward motion of the cam block 54 will result in a simultaneous downward motion of both the adhesive applicator 58 and the transfer ram 62. During such downward motion, the alignment pins 48 engage with the sprocket apertures 38 in the tape 24. Such engagement results in an extremely precise alignment of the chip apertures 40, both to the adhesive applicator 58 and to the transfer ram 62. Precise alignment is very important in the transfer operation because it is necessary to have repeatability of location of the dots 42 of adhesive resin into a position where the leads 46 of the chips 44 will engage with the dots during each transfer step.

Within the transfer station 30 the alignment pins 48 also engage with alignment holes 64 formed in the underlying loading nest 28. Each of the loading nests 28 is constructed as a spring-biased outer member 66 surrounding a pedestal member 68. In the disengaged configuration shown in FIGS. 4 and 5 the top surface of the outer member 66 is located above the top surface of the pedestal member 68. Such a condition results in the formation of a pocket in which one of the chips 44 rests. A vacuum port 69 is provided to retain the chips 44 within the pocket.

Figures 7, 8:
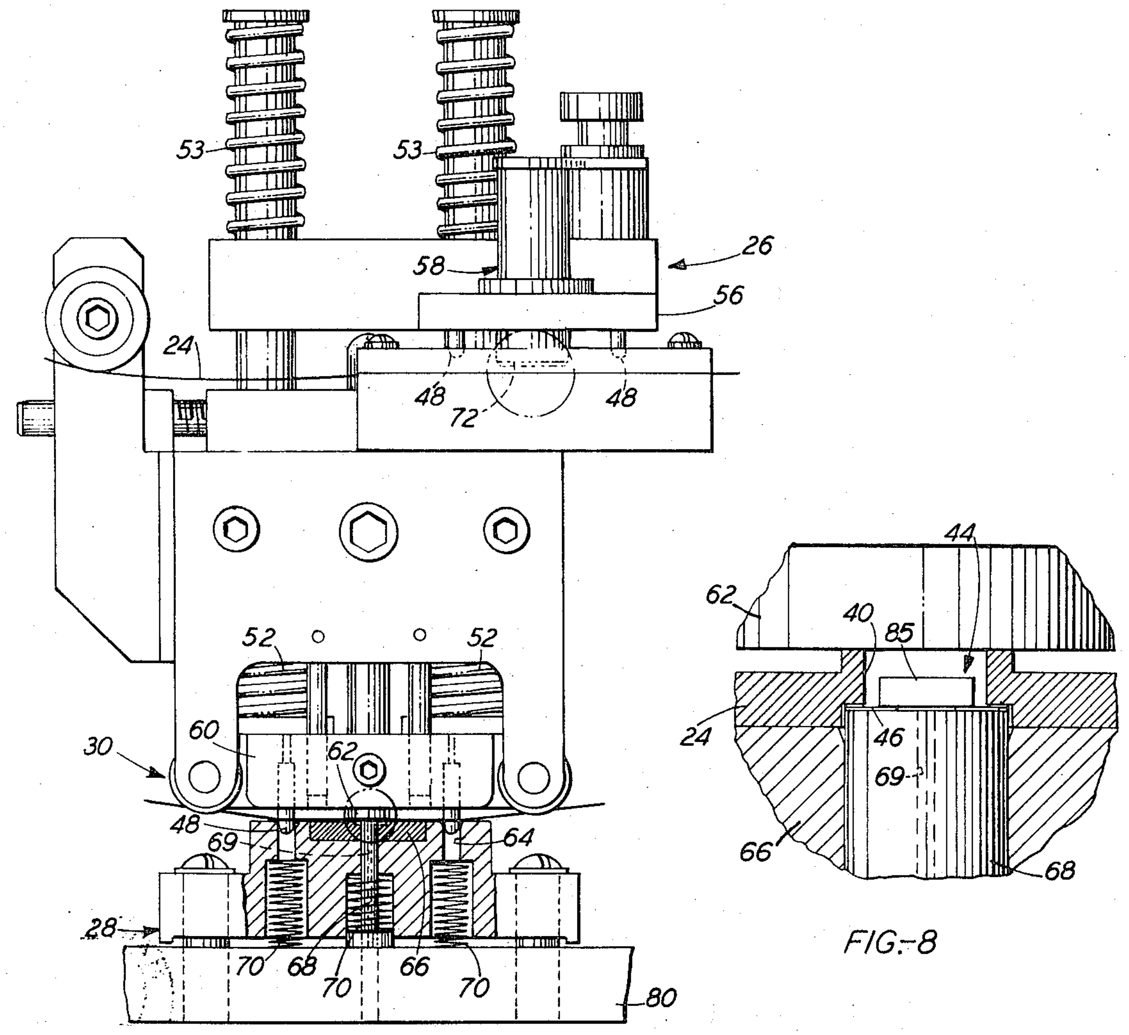
FIG. 7 is an elevational view of the portion of the machine of FIG. 4 shown in an engaged position.
FIG. 8 is an enlarged portion of an encircled area of FIG. 7.

When the cam member 54 is lowered, the transfer ram 62 engages with the tape 24 and forces the tape against the top surface of the outer member 66 to drive said outer member downwardly. When downward motion of the outer member 66 occurs, the top surface of the pedestal member 68 projects above the top surface of the outer member 66 as shown in FIG. 8. Such a condition permits direct contact between the dots 42 of adhesive on the tape 24 and the leads 46 of the chip 44, which is supported on the pedestal member 68. The pressure exerted on the leads 46 is limited by the forces developed by the springs 52.

Upward pivoting of the cam roller arm 50 results in a reverse motion of the cam block 54 and a consequential lifting of the transfer ram 62. As a result of such lifting, the outer member 66 of the nest 28 is permitted to move upwardly under the force of springs 70 and the top surface of the pedestal member 68 again forms the bottoms of the pocket. The chip 44, of course, does not drop into the reformed pocket, but instead is retained on the tape 24 by the adhesive dots 42. Thus, a loading of one of the chips 44 to the tape 24 is accomplished.

Figure 10:
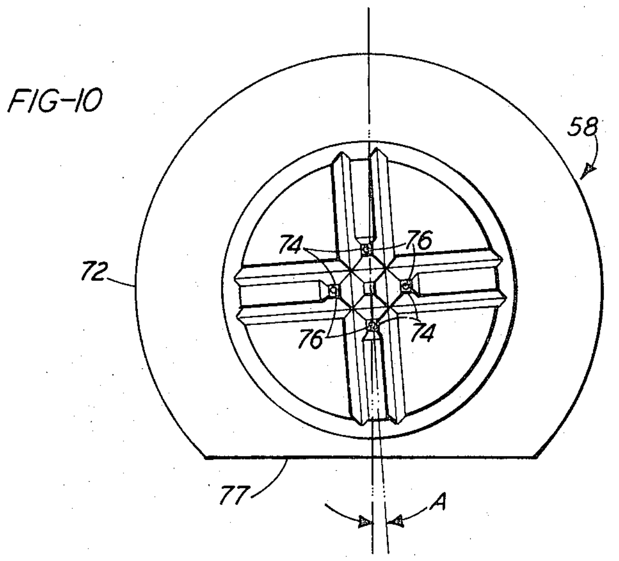
FIG. 10 is a plan view of an adhesive applicator taken along the lines 10—10 of FIG. 6 and rotated 90° clockwise.
Figure 9:
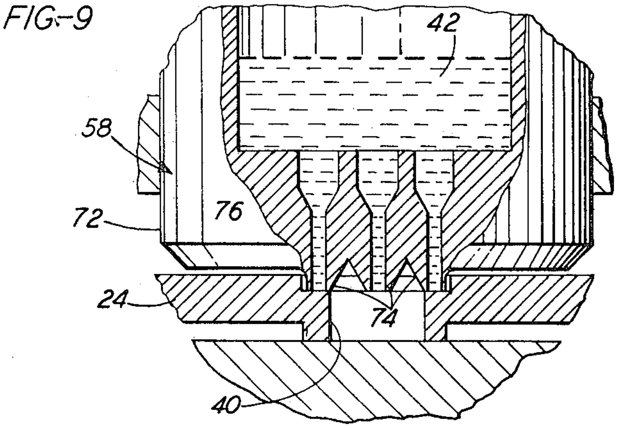
FIG. 9 is an enlarged portion of an encircled area of FIG. 7.

Simultaneously with the transfer of the chip 44 to the tape 24, the adhesive dots 42 are being applied to a portion of the tape 24 surrounding one of the chip apertures 40. The adhesive-applicator 58 includes a hollow barrel member 72 which acts as a reservoir for a liquid adhesive resin. The barrel member 72 is provided with a closed end at the bottom thereof. The closed end is carefully shaped to provide four adhesive-applicator tips 74 as shown in FIGS. 9 and 10. The tips 74 are formed by drilling four holes 76 through the bottom of the barrel member 72. Each of the holes 76 have a diameter of approximately 0.005 inch. The area surrounding each of the drilled holes 76 is then made into a projecting pedestal, approximately 0.007 inch square, by grinding away the surrounding portion of the bottom of the barrel member 72.

There is a machined barrel-flat 77 provided on the applicator 58 which is used to orient the applicator to the axis of the tape 24. It should be noted that the pattern of the tips 74 is rotationally shifted by an angle A from a direct alignment with the barrel-flat 77. The rotational shifting permits the placement of the adhesive dots 42 in positions that are slightly off center from the centerlines of the chips 44. The off-center placement, of course, results in the adhesive dots 42 being precisely located under the leads 46 as shown in FIG. 3. If the chips 44 were provided with an odd number of leads on each side instead of an even number the rotational shifting would not be required.

When the tips 74 are placed in contact with the tape 24 the adhesive resin which is on the outer surface of the tips forms an air-tight seal between the tips and the tape. As the applicator 58 is withdrawn from the tape 24 a vacuum force develops which tends to draw the resin out of the holes 76 to form the dots 42 at the desired positions. The air-tight seal between the tips 74 and the tape 24 breaks after the applicator 58 is partially withdrawn. The distance to which the applicator can be withdrawn before the air-tight seal breaks is determinative of the volume of the resin which is pulled out of the holes 76 by the vacuum force and thus is also determinative of the size of the dots 42.

The alignment pins 48 of the applicator station 30 engage with the tape 24 prior to the application of adhesive thereto. Such engagement between the pins 48 and the sprocket apertures 38 assures a highly predictable location of the four dots 42. When the portion of the tape 24 to which the adhesive has been applied is ultimately indexed to the transfer station 30, the same sprocket apertures 38 will again be utilized to align that portion of the tape to one of the chips 44 that is held within one of the nests 28. Thus, when the chip 44 is pressed against the tape 24, the leads 46 will be precisely aligned with the dots 42 of adhesive and a desired loading of the tape will result.

In order that the applicator function as desired, it is necessary that the adhesive have a flowable nature. It is also necessary that the adhesive should be tacky enough to hold the chips 44 within the tape 24. An example of an adhesive material having the desired combination of properties is a silicone resin available from Dow Corning Corporation, Midland, Mich. The material bears the product designation XR-62-047 Resin.

The tackiness of the adhesive can be improved by applying some heat to the dots 42 before they reach the transfer station 30. Application of heat is readily accomplished by directing a heated stream of air against the tape from a conventional hot-air type heater unit 79.

Figure 6:
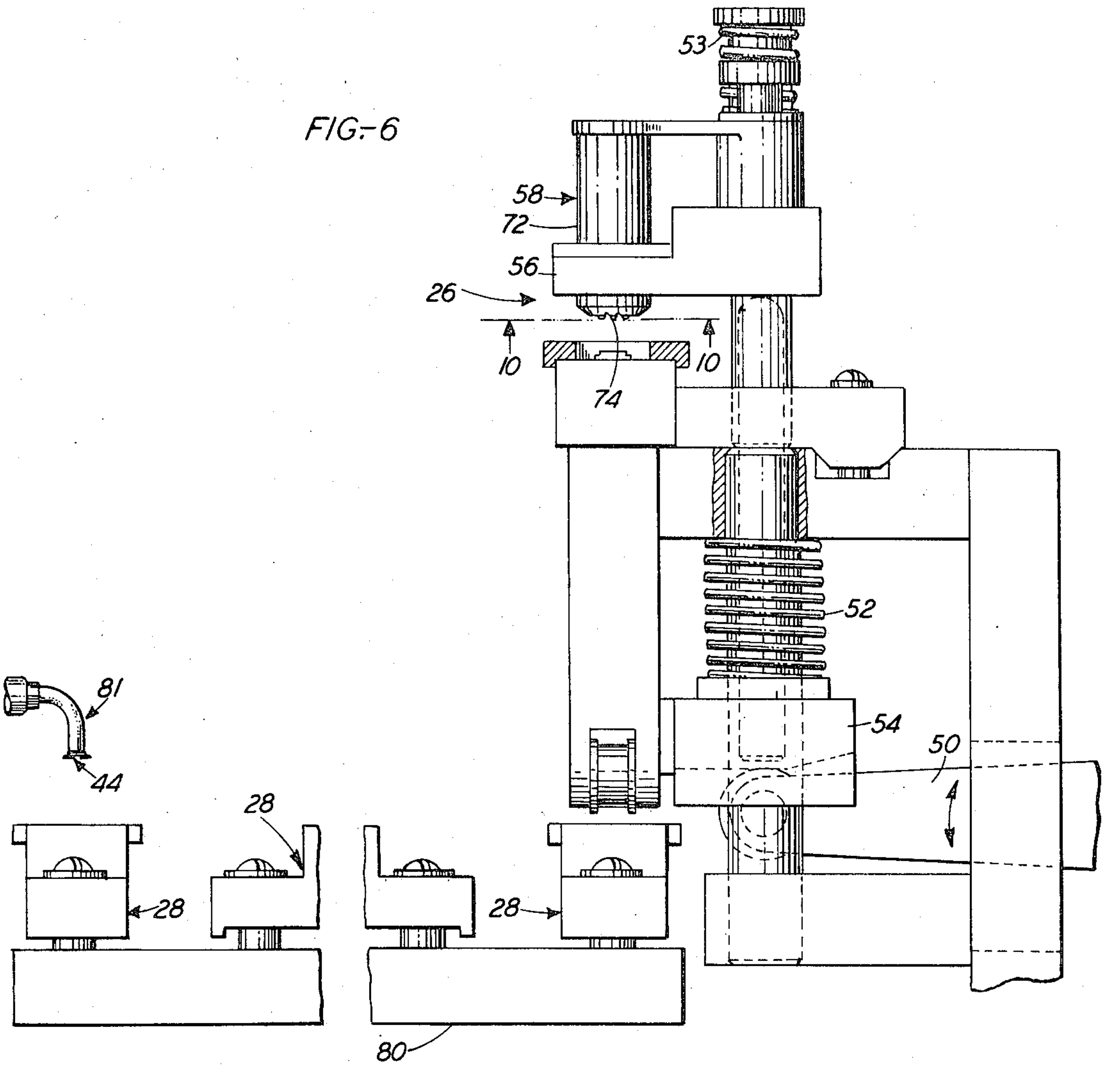
FIG. 6 is an elevational view of the machine of FIG. 1 taken along the lines 6—6.

A key feature necessary for efficient operation of a tape loading machine is an ability to quickly position the chips 44 into the desired location within the transfer station 30. This efficient positioning is achieved in the machine 20 by utilizing a plurality of the nests 28 mounted on an indexable turret 80. The chips 44 are loaded into the nests 28 when the nests are in a position remote from the transfer station 30 as shown in FIG. 6. A conventional chip handler 81 of the sort available from Kulicke and Soffa Co. as model No. 590 can be utilized to deposit the chips 44 into the nests 28. The turret 80 is arranged to index at the same time that the sprockets 34 indexes the tape 24. Thus, with each indexing step a loaded one of the nests 28 is brought into the transfer station 30. During the time that actual transfer and adhesive application are occurring, the turret 80 is, of course, stationary. During the stationary period, an empty one of the nests 28 is re-loaded with the conventional chip handler 81. Vacuum forces operating through the port 69 assist in the loading of the nests 28.

Figure 11:
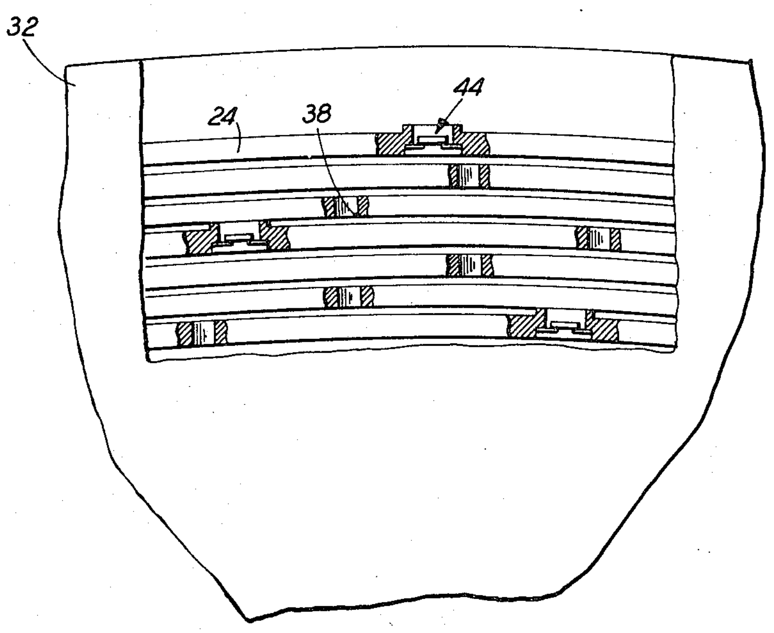
FIG. 11 is a view of a portion of the take-up reel of the machine of FIG. 1 with portions thereof removed for purposes of clarity.

The tape 24 is provided with an embossed configuration about the periphery of each of the apertures 40; as illustrated in FIGS. 2, 3, 5 and 8. It can be seen that the embossing is deep enough to form a pocket 84 into which the leads 46 can fit. A body portion 85 of the chip projects into the chip aperture 40. The embossed configuration of the tape 24 is highly desirable when the tape is used as a package for the chips 44 as shown in FIG. 11. The chips 44 are protected from damaging contact with other portions of the tape 24, when the tape is wound onto the reel 32. Additionally the chips 44 are held in a predictable location by the embossed configuration. Such predictability of location is very useful in future bonding operations.

After the tape 24 is wound into a package, it can be placed in a heated environment at 150°C for approximately 10 minutes in order to partially cure the adhesive resin which holds the chips 44 in place. The partial curing increases the effectiveness of adhesive and assures that the package of chips 44 and tape 24 can withstand handling associated with transport and shipping.

Figure 12:
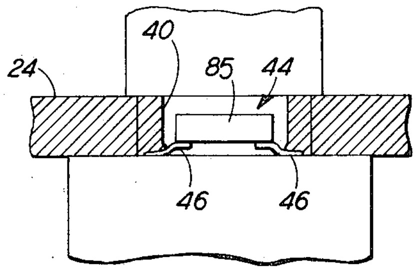
FIG. 12 is an enlarged sectional view of a bonding operation being performed on a device held in a complaint-bonding tape.

In a subsequent bonding operation, the embossed portion of the tape 24 is pressed into a flat shape as shown in FIG. 12. Thus, the embossing arrangement illustrated in FIG. 5 does not inhibit efficient bonding of the chips 44.

After bonding is complete, removal of the tape 24 from the bond site can act as a test for soundness of the bond. If the bonding between the beam leads 46 and a substrate is sound, the adhesive will readily release from the back sides of the leads. However, if the bonding is weak, an attempted removal of the tape 24 will result in a tearing away of the chip 44 from the substrate. Thus, the adhesive and tape 24 can be used to test bonds in accordance with an inventive method set forth in patent application Ser. No. 832,630 filed in the name of B. H. Cranston on June 12, 1969, now U.S. Pat. No. 3,634,930, issued Jan. 18, 1972, and assigned to assignee of record of this application.

Although certain embodiments of the invention have been shown in the drawings and described in the specification, it is to be understood that the invention is not limited thereto, is capable of modification and can be arranged without departing from the spirit and scope of the invention.

What is claimed is:

1. A method of loading beam-lead devices onto successive selected portions of a continuous tape, each such portion having an aperture for receiving a device and an embossed configuration about the periphery of the aperture, the method comprising the steps of:

moving at least two device receiving members between a remote location and a device transfer station:

sequentially placing a device into each receiving member upon such member having been moved to the remote location;

indexing the tape in sequence past an adhesive applicator station and the transfer station, such indexing taking place simultaneously with the movement of one of the receiving members to the transfer station;

precisely aligning the aperture of one of the selected portions with the applicator station and the aperture of another of the selected portions with the device in the receiving member at the transfer station;

applying an adhesive to the embossed configuration in a peripheral pattern about the aperture, upon such aperture of each successive selected portion of the tape being precisely aligned with the applicator station; and displacing the device in the receiving member at the transfer station and the selected portion of the tape in alignment therewith relative to each other to insert the device into the aperture and the beam-leads thereof into the embossed configuration and to contact at least some of the beam-leads of the device to the adhesive thereat, whereby the beam-leads of the device are secured to the adhesive and loading of the tape is accomplished.

2. The method of claim 1 wherein:

the application of adhesive is performed on an upwardly facing surface of the tape and the transfer of the device is accomplished against a downwardly facing surface, such a result being achieved by inverting the tape during the translation thereof.

3. A method of handling beam-lead semiconductor devices which comprises the steps of:

aligning the devices to cavities formed in a tape, the beam-leads of the devices extending over the periphery of the cavities to align with pocket-like depressions in the tape located about each of the cavities;
adhesively securing beam leads of the devices to the pocket-like depressions, thereby suspending the devices in the cavities; and
reeling the loaded tape to provide a compact and damage-preventing package, said cavities and depressions forming protective barriers for the devices and their beam-leads in the reeled package.
* * * * *